Oct. 4, 1938.   L. J. R. HOLST   2,132,003
MOTION PICTURE APPARATUS
Filed Sept. 25, 1933    3 Sheets-Sheet 1
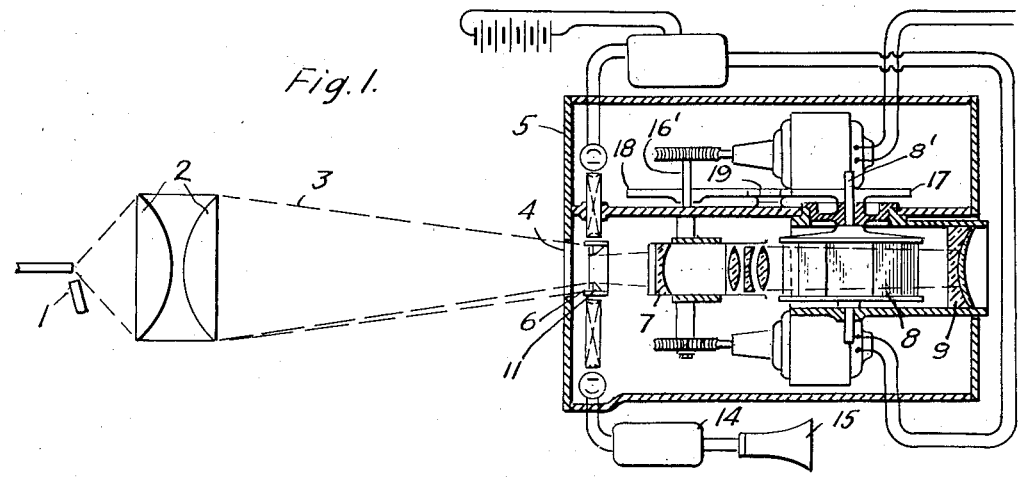
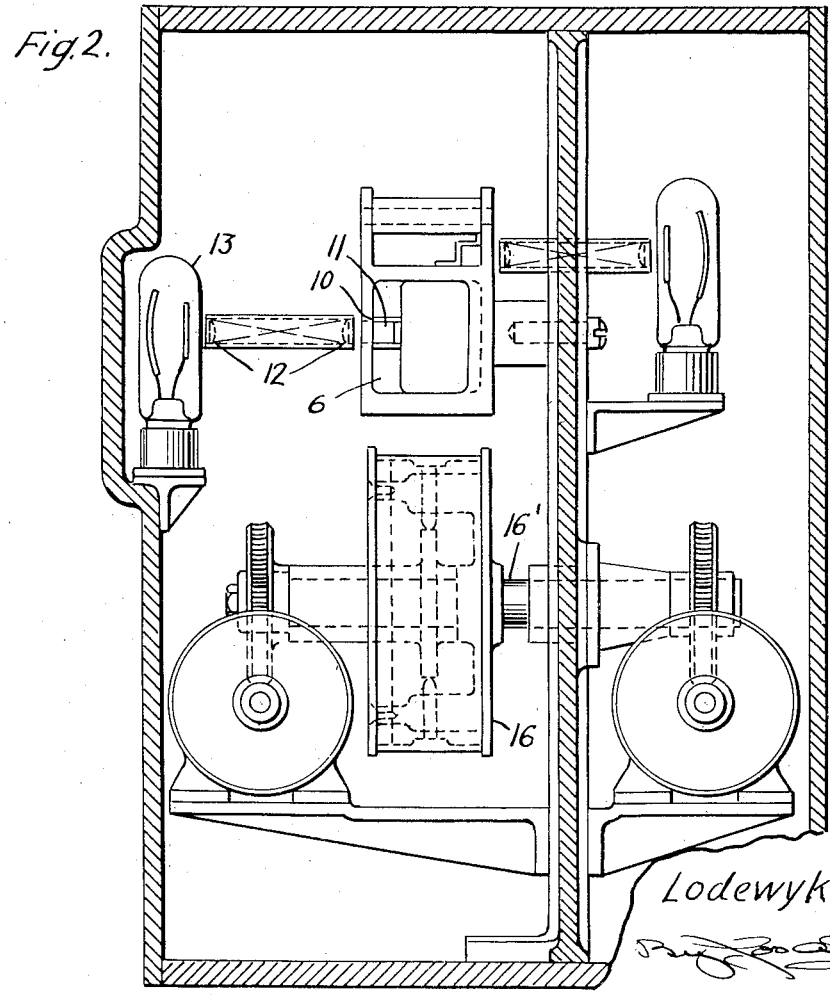
Inventor
Lodewyk J. R. Holst
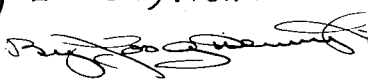
Attorney

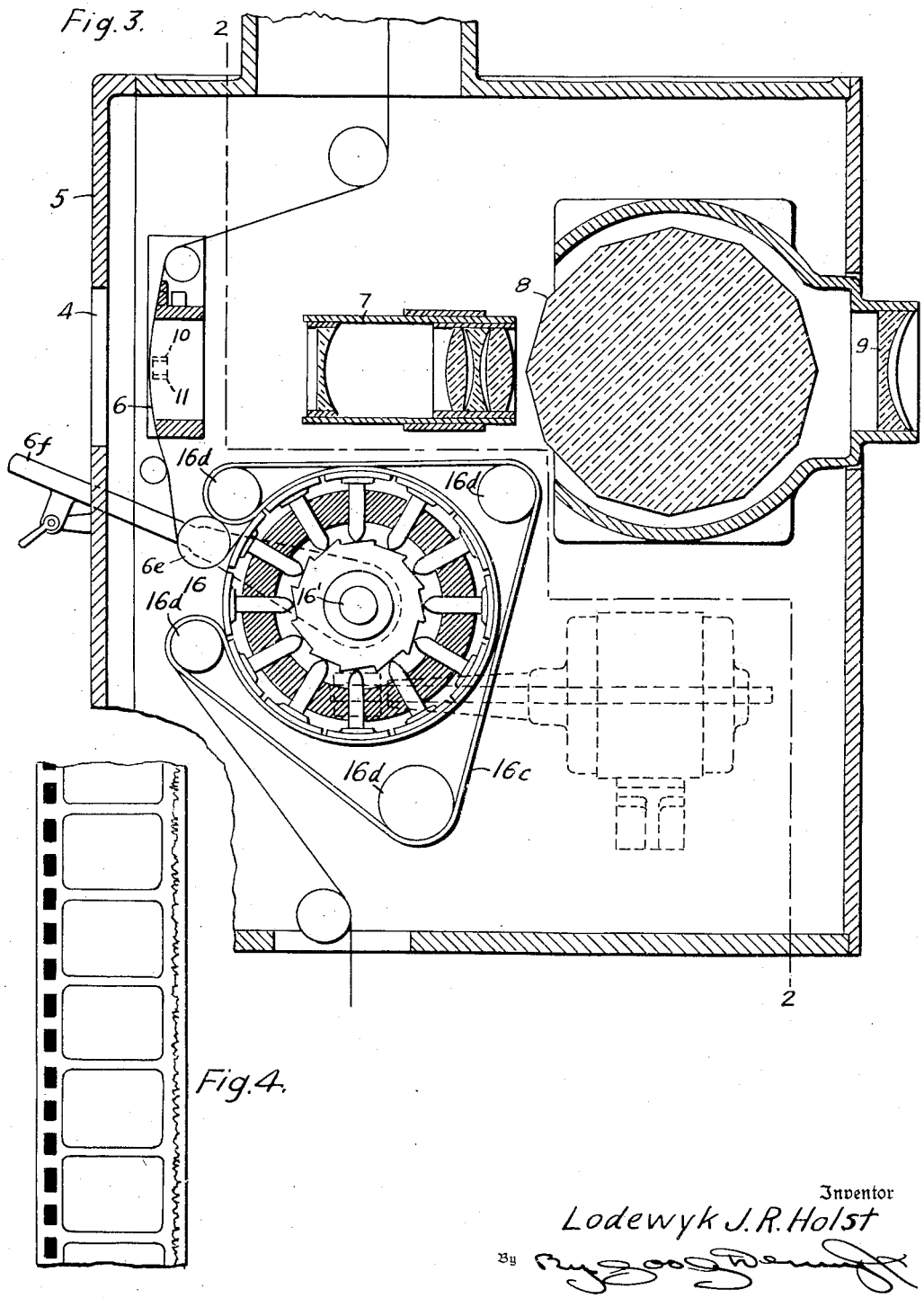

Oct. 4, 1938.  L. J. R. HOLST  2,132,003
MOTION PICTURE APPARATUS
Filed Sept. 25, 1933  3 Sheets—Sheet 3
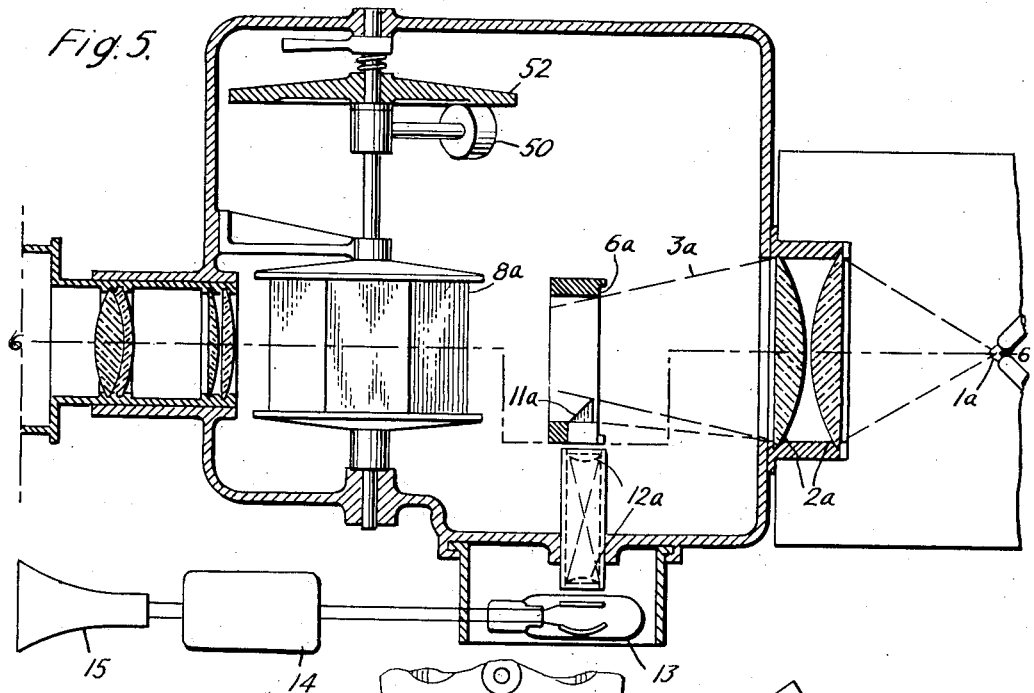
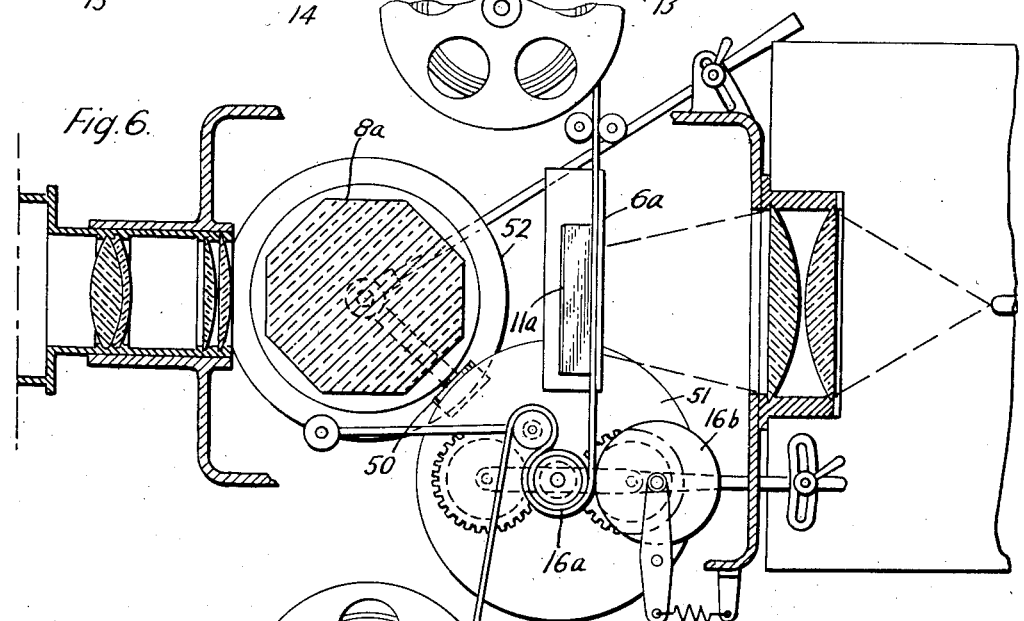
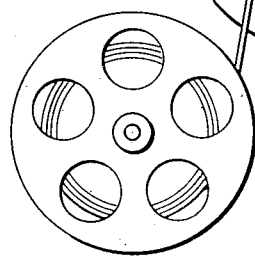
Inventor
Lodewyk J. R. Holst
By
Attorney Patented Oct. 4, 1938

2,132,003

UNITED STATES PATENT OFFICE 2,132,003

MOTION PICTURE APPARATUS

Lodewyk J. R. Holst, Brookline, Pa., assignor to The S. M. M. H. Corporation, Dover, Del., a corporation of Delaware Application September 25, 1933, Serial No. 690,852

1 Claim. (Cl. 88—16.2)

My invention is an improved apparatus for producing motion pictures and complementary audible entertainment from a light beam emanating from a single light source and acting upon a continuously moving film strip having thereon picture images and complementary sound images in such close juxtaposition that both are simultaneously acted upon by the same light source. When sections of such film are eliminated, the retained portions of the film contain the sound records complementary to the retained picture images since each picture image has its complementary sound image directly opposite thereto or so close, say within three or four frames, that the elimination of the intervening film section would be visually and audibly imperceptible.

My improvements further provide means for eliminating the effect of shrinkage or stretching of the film upon the reproduction of its visual or audible record, thereby eliminating "creeping" of the picture or alteration of the tone or pitch of the sound. By my improvements, any shrinkage or stretching may be compensated for by varying the longitudinal length of film moved through the light beam per second or other unit of time. Such regulation is preferably controlled by the movement of the film itself and insures that the proper number of sound vibrations per second are reproduced and that the distance moved by an image point in a picture image is proportionate to the displacing power of an image-ray deflector comprising a plano-parallel transparent glass block having at least two parallel surfaces which is rotated in the path of the image rays emanating from the picture images of the film. Such image rays are preferably converged before entering the block to form an aerial image on the opposite side of the block from the film and which aerial image is preferably projected to form an enlarged screen image by a lens of negative focal length having its focal point slightly offset from the real image plane of the converging lens complementary to the film or object plane thereof.

The purposes of the present invention are primarily to provide continuous moving picture projectors having optical compensation for the uninterrupted movement of an image carrier strip across the exposure aperture and utilizing the illumination of the sound track from the light beam used to illuminate the picture gate; and further to provide the projector and the image-carrier band with cooperative means permitting the use of imperforate carrier strip for the pictorial and audible records by compensating for the uneven shrinkage or stretching of successive portions of such strips, and maintaining the screen image correctly framed after it has once been adjusted to the correct positions and maintaining the reproduced sounds at the proper tone and pitch.

The characteristic features and advantages of my improvements will further appear from the following description and the accompanying drawings of illustrative embodiments of my invention.

In the drawings, Fig. 1 is a diagrammatic plan view, partly in section, illustrating to approximately correct scale, the relative position of a light source and the principal elements of my improved projector; Fig. 2 is an enlarged vertical sectional view, also of diagrammatic character, of the projector shown in Fig. 1, taken on the line 2—2 of Fig. 3; Fig. 3 is a longitudinal vertical sectional view of the projector shown in Fig. 2, showing the differential mechanisms for regulating the relative speeds of the rotating block and the film feeding mechanism; Fig. 4 is a face view of a portion of imperforated record carrying strip adapted for use in the projector illustrated in Figs. 1 and 2; Fig. 5 is a horizontal sectional view diagrammatically showing a modified form of projector embodying features of my invention; and Fig. 6 is a vertical sectional view on the line 6—6 of Fig. 5.

In the embodiment of my invention illustrated in Figs. 1 to 4 inclusive, a light beam originating in the arc 1 is concentrated by the condensers 2 to form a beam 3 directed toward the aperture 4 in the casing 5 of the projector. The center line or axis of the beam is substantially coincident with the optical axis of the projector and passes through the film gate 6, the adjustable lens assembly 7, the rotatable block 8 located in the image space of the lens assembly 7, and the projecting lens 9 having its focal point slightly in front of the image plane of the lens assembly 7.

The light beam proceeding from the condensers 2 to the image exposure aperture is larger in cross-section than this aperture. It is thus quite feasible to provide alongside of the picture aperture 6 a small secondary opening 10, which will be well within the confines of the smallest practical beam 3, and placed so far sideways that it will be traversed by the usual sound track $a$ carried at the side of the picture images $b$ on a strip $c$. Directly behind the secondary aperture 10 is a small 45° total reflecting prism 11 which bends the light rays of varying intensity transmitted through the sound track a through a narrow slot and through usual optical parts 12 to make them impinge upon the sensitive surface of a photo-electric cell 13. The variations in light intensity cause currents of proportional intensity to its illumination to be sent into a suitable amplifier 14 and thence in a loudspeaker 15.

The quality of the sound so reproduced is largely dependent upon the regularity with which the sound track travels and consequently the shrinkage or stretching of the carrier strip is apt to cause errors in the sound reproduction resulting from a difference in frequency, comparable to the errors caused by shrinkage or stretching of the pictorial portion of the carrier strip, although the visual and the audible errors manifest themselves in different manner to the observer. Such defects are simultaneously eliminated when the carrier-band is caused to travel always at such speed that exactly the desired number of pictures (usually twenty-four) are exposed per second, no matter whether they measure in the aggregate the normal 18 inches in length, or, through moisture and heat influences, have stretched or shrunk away from this standard length. The condition requisite for desired results is thus that a standard number of unit-views per second, be they longer or shorter than the established standard of 18 inches per twenty-four pictures, be fed across the exposure apertures.

The movement of the proper number of image units per unit of time may be effected automatically by feeding mechanism for the carrier strip, which causes increased or decreased lengths of strip to be fed across the exposure apertures, while maintaining equal relative angular velocity of both the block 8 and the film feeding drum 16. The differential action required is preferably produced by varying the circumferential length of the film feeding drum 16, i. e., varying its operative diameter, in such manner that during one complete revolution of the block 8 a number of unit-views equal to the number of parallel faces of the block 8 has been caused to pass through the optical axis, independent of the actual size of the individual images on the film strip. The size of the aerial images produced by the lens 7 from the film image may be varied by adjusting the lens assembly 7 along its axis.

In the embodiment of this feature of my invention illustrated in Figs. 2 and 3, feed drum 16 has a normal circumference of equal to sixteen normal unit images. To project twenty-four units per second the drum 16 must make one and one-half revolutions per second, and as the glass-block 8 illustrated has six pairs of parallel faces, the block 8 must make two revolutions per second.

The shaft 16' of the feed drum and the shaft 8' of the glass-block mounting are therefore operatively connected by spur gears and an intermediate idler, giving the drum 16 a speed proportion of one and one-half to two, or as three to four with the prism block 8, and this relative angular speed remains constant. The idler 19 is used to cause the drum 16 and the glass block 8 to rotate in the same direction when feeding the film or carrier-strip over the top of the drum, as shown in Fig. 3. The mechanical design can, however, be so arranged that the carrier-strip is fed on to the drum from below, in which case the drum will rotate in an opposite direction, and spur-gears making direct contact can then be used to connect the drum and the prism-block. The feed drum 16 is composed of an inner side plate or disk 20 provided with an annular flange 21 on its interior face, and an outer side plate 22 fastened to suitable extensions 23 of this flange. The flange 21 contains a number, preferably twelve, of radially equally spaced apertures 24, which serve as guides for an equal number of plungers 25. Each plunger 25 has fixed thereto a curved head 26 forming a section of a rim which latter extends in width between the inner faces of the two side plates 20 and 22 without direct pressure against either. The plungers 25 are all of exactly equal length and are provided with smoothly rounded and well hardened tips 27 at the inner end. An endless spiral spring 28 is laid into a grooved recess 29 provided for it along one of the edges of the rim-sections and by its tension the plungers are all brought and held in contact with faces 30 of a twelve-sided ratchet-shaped hub 31.

The hub 31 is mounted on an extension of the shaft 32 of the inner-face plate 20 of the drum 16 and can freely rotate on such shaft.

The ratchet-teeth 30 are of such slope that they will cause the plungers to move to the desired radial displacements to cause the maximum or the minimum circumferential length of the rim made up of the rim sections or heads 26. The several parts are dimensioned so as to cause the plungers to contact in the middle of each tooth when the rim has the standard circumferential length.

When the ratchet 30 and the remaining components of the drum 16 rotate with equal angular velocity, i. e., at the same number of revolutions per unit of time, no change in the circumferential length of the rim of the drum 16 can result. However, as soon as there is any difference in the angular velocity of the drum parts the ratchet-teeth 30 will move with relation to the plungers 25 and cause corresponding changes in the circumferential length of the rim of the drum. The hub 33 of the ratchet-wheel 31 extends outwardly from the drum, and is provided with a worm gear 34 engaging the worm 35 of a small electric motor 36.

In similar manner, the spindle 32 of the inner side-plate 20 extends through a bearing bushing 37 into the rear part of the projector housing and carries a worm wheel 38 engaging with a worm on the shaft of another electric motor 40.

Both motors are of the synchronous type so that suitable worm-gear proportion will result in rotation of the driven shafts at predetermined speeds.

The motor 40 is preferably coupled to a 60 cycle alternate current drawn from the usual line-supply, whereas the motor 36 receives its current from a storage supply as the battery 41. The number of impulses in the current passing through the motor 36 is controlled by means of electric-relay mechanism 42 controlled by the action of a photo-electric cell 43.

The photo-electric cell 43 receives its current generating illumination through a number of transparent sections d of the carrier band c, such sections d being separated by a series of equally spaced opaque parts e as therein in Fig. 4. These opaque portions are spaced so as to cause 60 light interruptions in a length of twenty-four images and thereby energize the relay sixty times per second, and feed sixty impulses to the motor 36 attached to the ratchet-hub mechanism 34. The film sections d and e are illuminated from the beam 3 through a suitable auxiliary aperture 44 provided in the main gate block. The aperture 44 is so positioned that any movement of the film will cause the aligned opaque spaces to pass this auxiliary gate some short time before the image opposite to the particular group of opaque spaces arrives in the position for exposure to the screen through the aperture 6. In this manner the slight time-lag required for a response in the motor speed, as a result of too fast or too slow travel of the carrier ribbon, as compared with the linear-speed of preceding pictures, is absorbed in the interval and the necessary readjustment of the ratchet has occurred when the image reaches exposure position.

Assuming that a given portion of the carrier-strip nearing the exposure aperture 6 has shrunk more than the portion presently being projected, there will then be more than 60 impulses per second given the motor 36 by the passage of spots e across the auxiliary gate. The ratchet motor 36 receives the increasing number of impulses and as a result begins to gain on the unchanged speed of the other motor 40. The changed position of the teeth 30 permits the spring 28 to draw in the plungers 25 until the resulting reduction in the peripheral length of the rim formed by the heads 26 has reduced the carrier speed to the point where again 60 impulses are given to the relay, and the relatively shrunken portion of the film or image carrier will again be driven at the rate of twenty-four image units per second. Both motors will continue in synchronous operation until a new readjustment is required by other portions of the carrier-strip.

It is quite evident that whenever a less-shrunken portion approaches, the corrective action will be made in the opposite direction by the too slow rotation of the ratchet-motor.

In the embodiment of the invention illustrated in Figs. 5 and 6, light from the source 1a is converged by the condensers 2a into a beam 3a which illuminates a gate 6a across which a film section c is continuously fed so as to illuminate both the picture image units b and the sound track a.

Preferably, each picture unit b has in direct lineal transverse alignment therewith the sound record section complementary thereto, thereby providing for synchronized reproduction of audible sounds or the like and of pictures relevant thereto from the same light source. If desired, the uninterrupted space for the sound record may be enlarged by offsetting the longitudinal center line of the image units from the longitudinal center line of the film strip.

As the auxiliary sound records are not adapted for projection by the lens which brings the moving pictures on the screen, I provide adjacent to one of upright borders of the image gate 6a a 45° total reflection prism 11a as high as the aperture in the gate and of such a base-width as to intercept the full width of the strip reserved for the secondary records or sound image. The light passing through the sound track is thereby deflected at right angles in a horizontal direction to be received in the collective lens of an optical system 12a used for the reconversion of the photo-impressions to their equivalent tonal values through the photo-electric cell 13, amplifier 14 and loud speaker 15 previously described.

In this form of mechanism, the image ribbon is fed across the gate aperture 6a with both the sound track and image units in the beam 3 by means of a drum 16a against which the film strip is pressed by a spring pressed roller 16b.

The drum 16a and the glass block 8a are driven in unison, and any requisite adjustment of their relative speeds to compensate for the shrinkage or stretching of the film may be effected by adjustment of the radial position of the friction wheel 50 relative to the axes of the friction disks 51 and 52 through which the block 8a is rotated from the film feeding mechanism as more fully set forth in my Patent No. 1,928,255.

In the form of the invention shown in Figs. 2 and 3, the film strip is held in close contact with the rim of the feed drum 16 by an idler belt 16c which runs around the pulleys 16a, and the framing of the picture images in the gate 6 may be adjusted by means of the roller 6e carried on the adjustable handle 6f.

Having described my invention I claim:

In motion picture apparatus, the combination with means for moving continuously a film having thereon visual picture units and a light transmitting sound track of variable light permeability; and means comprising a rotatable device having at least two parallel surfaces for angularly deflecting image rays from sequential film sections continuously moved by said first named means, of a light source, means for concentrating a beam from said light source toward said refracting device, sound reproducing means operable by variations in the light intensity of the portion of said beam passing through said track concurrently with the projection of visual images by said beam from said picture units; and having a light refracting element in the path of the portion of said beam which has passed through said track, and means including a member rotatable relatively to and engageable with the first named means and controlled by the movement of a film section across a portion of said beam for regulating the relative speeds of said first named means and said second named means.

LODEWYK J. R. HOLST.